W. WILSON.
Sewer-Trap Attachment.
No. 217,841.  Patented July 22, 1879.
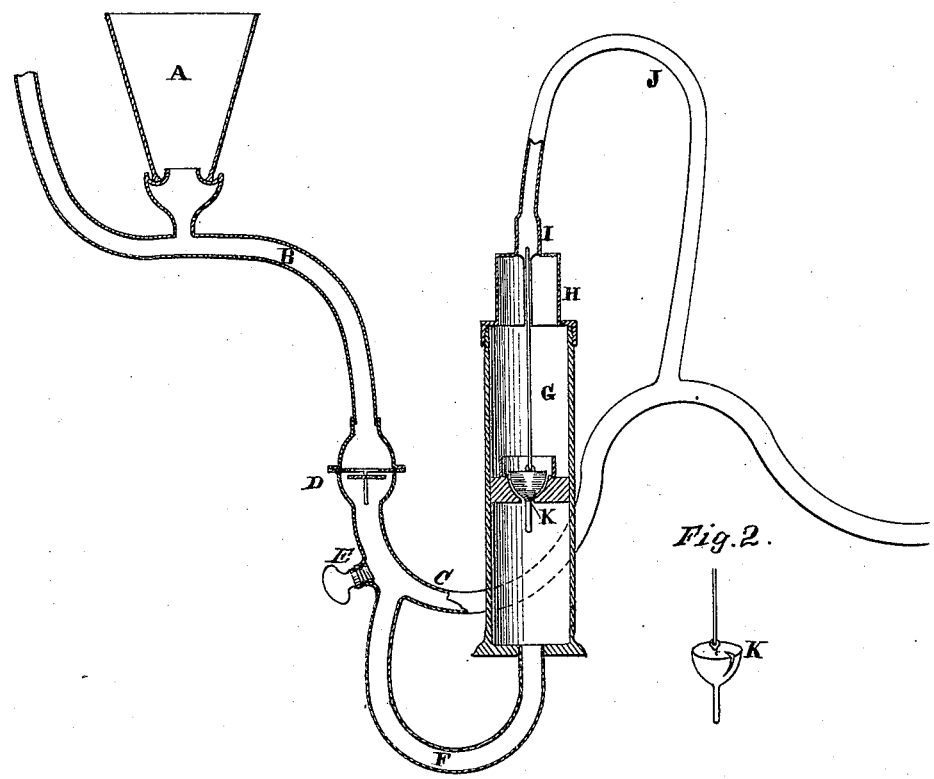
Witnesses
Geo. H. Strong.
Frank A. Brooks
Inventor
William Wilson
By Dewey & Co.
Attys

UNITED STATES PATENT OFFICE.

WILLIAM WILSON, OF OAKLAND, CALIFORNIA.

IMPROVEMENT IN SEWER-TRAP ATTACHMENTS.

Specification forming part of Letters Patent No. 217,841, dated July 22, 1879; application filed January 31, 1879.

*To all whom it may concern:*

Be it known that I, WILLIAM WILSON, of the city of Oakland, county of Alameda, and State of California, have invented a Sewer-Trap Attachment; and I hereby declare the following to be a full, clear, and exact description thereof, reference being made to the accompanying drawings.

My invention relates to an improved attachment for sewer-traps; and my improvement consists in attaching to the S-trap a bottle or chamber suitably connected both to the lower bend of the S-trap and the main sewer-pipe, so that it will fill as the trap fills, when water is allowed to pass from the basin or hopper. Then, when the water in the trap siphons off, the supply in the bottle or chamber passes slowly into the trap, thus filling it, closing a valve in the pipe, and preventing the entrance of sewer-gas into the room in which the basin or hopper is placed. Suitable arrangements of valves are provided, and the cylinder is so attached that it may be inspected or the perfection of the trap tested at any time.

Figure 1 is a sectional elevation of my apparatus. Fig. 2 is a view of the valve.

Let A represent a hopper or basin, into which water is poured so as to be carried from dwellings into the sewers through the pipe B. In this pipe is placed the usual S-trap C, intended to prevent the entrance of foul gases from the sewer into the room in which the basin or hopper is placed. The theory upon which this S-trap operates is, that the lower bend or curve will remain filled with water at all times and act as a seal to prevent the gas coming through the pipe. In practice, however, it is found that these S-traps do not accomplish the object sought, since the water siphons off and the trap is left empty of water, the same as the straight pipe is, thus admitting sewer-gas to the dwellings. The object of my attachment is to prevent this siphonage from the trap, and thus render the S-trap efficient for the purpose for which it is intended. The attachment also serves to close a valve in the drain-pipe of the basin, so as to thoroughly prevent the ingress of any odor or gas.

In a suitable place in the pipe B, between the basin and S-trap, is placed a small valve, D, which allows the water to flow downward, but prevents the water or gas rising into the pipe above the point where it is placed in case it should come through the trap.

At the lowest bend of the S-trap, where there is usually an opening or cock, E, for cleansing the trap, I attach a pipe or tube, F. This tube is connected with the bottom of a glass cylinder, G, of suitable size and shape. This will usually consist of an ordinary glass bottle having a hole made in it for connection with the tube F. The top of this bottle is closed with a stopper, H, having a neck, I, to which is attached another tube, J, said tube being then connected with the top bend of the S-trap, as shown. In this stopper is placed a small valve, K, said valve having a minute perforation through it, for the purpose hereinafter described. For convenience of illustration, I have shown in the drawings this valve with a seat in the middle of the cylinder G, and with a stem extending upward; but I prefer to have the valve inclosed in the stopper, which screws into the bottle.

My device operates as follows: When the water is allowed to flow from the basin or hopper into the pipe B it passes into and fills the S-trap C. It also flows through the tube F into the cylinder or bottle G, and fills said cylinder. In order that this cylinder may fill with water the valve in the stopper lifts as water enters, so that the air may pass out from the bottle or cylinder into the sewer-pipe through the tube J, attached to the neck of the stopper. As soon as the water ceases to flow from the basin into the S-trap that in the lower part of the S-trap siphons off with customary promptitude, and the greater the rush of water the more certain it is to siphon off and leave the S-trap empty. Now, the valve K in the stopper of the bottle or cylinder has a minute perforation through it, through which a small quantity of air may pass from the sewer-pipe through the tube J as soon as the draft in the sewer-pipe caused by the siphonage ceases. The admission of this small quantity of air into the bottle or chamber above the water which is in it allows said water to slowly pass out of the bottom of the bottle through the tube F, and thereby fill the S-trap gradually and slowly. In this way whenever the S-trap is siphoned off it is immediately filled again by the water in the bottle, so as to form a perfect seal against sewer-gas. As this water fills the trap it lifts the valve D, and prevents water or sewer-gas rising into the pipe.

When water is poured into the S-trap slowly in this manner, after the rush of the first flow is over, siphonage will not occur, as it does when water is passed through rapidly.

Should any small quantity of sewer-gas enter the bottle or cylinder through the tube J it will be prevented from rising through the S-trap, as the water in the bottle will remain at the same level as in the trap, and when the next water passes into the cylinder or bottle the water forces this air out through the valve, when the rush of water and air will carry it off.

It is designed to have this bottle or cylinder hung up beside the S-trap on basins for ready inspection.

When it is desired to cleanse the bottle, by disconnecting the upper pipe, J, and taking the stopper off, the bottle may be reversed and the water in the bottle and trap drawn off.

A valve may be placed in the lower bend of the pipe F, by which the pipe may be cleaned and the trap tested. This attachment may be readily fixed to traps already constructed, and is extremely inexpensive and simple of construction and operation.

Having thus described my invention, what I claim as new, and desire to secure by Letters Patent, is—

1. The trap B C, in combination with the supplemental tube F and the chamber G, with its valve K, having the slit or perforation, as shown, and the air-pipe J, substantially as and for the purpose herein described.

2. The trap B C, pipe F, and chamber G, with its valve K and air-inlet pipe J, as shown, in combination with the valve D, substantially as and for the purpose herein described.

In witness whereof I have hereunto set my hand.

WILLIAM WILSON.

Witnesses:
    CHAS. G. YALE,
    FRANK A. BROOKS.